Figure 12:
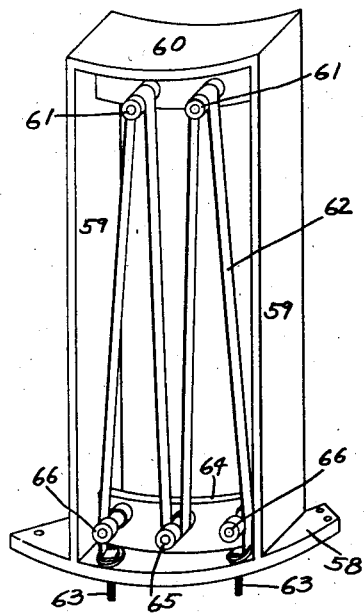

Dec. 18, 1934.  C. C. WILSON  1,984,907
AIR CONDITIONING FURNACE
Filed Dec. 26, 1933   2 Sheets-Sheet 1

INVENTOR,
Charles C. Wilson,
BY Honora A. Smith.
ATTORNEY

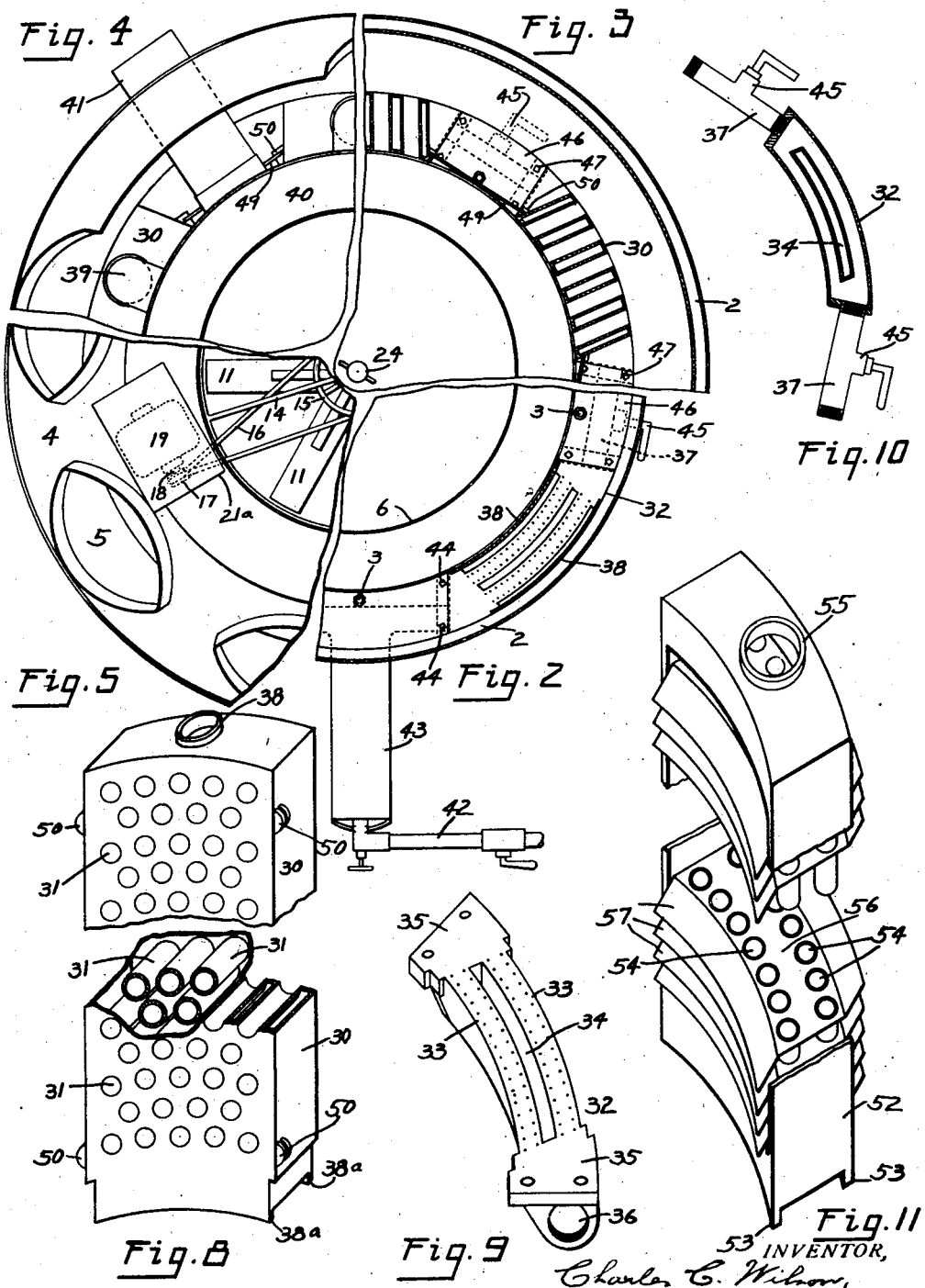

Patented Dec. 18, 1934

1,984,907

UNITED STATES PATENT OFFICE 1,984,907

AIR-CONDITIONING FURNACE

Charles C. Wilson, Dayton, Ohio

Application December 26, 1933, Serial No. 703,932

7 Claims. (Cl. 126—116)

This invention relates to new and useful improvements in air-conditioning furnaces.

It is one of the principal objects of my invention to provide an air-conditioning furnace of marked efficiency in respect to economy in fuel consumption and increased heating capacity in relation to its small size and round shape.

It is another object of my invention to provide in a furnace of this type, a central passage for a down flow of air which picks up moisture from a lateral water spray that is vertically adjustable to a position where it will be exposed to the desired temperature.

Another object of my invention is to conduct the heat units generated by the burners, through an annular passage which, in the upper portion of the furnace, surrounds the incoming air to preheat the same before it passes through the water spray.

After passing through a filter at the top of the furnace, the preheating area and the water spray, the prewarmed moisture laden air passes through heating elements that are disposed in spaced relation completely around the circular furnace wall, with a vertical annular space left between them and that wall, to provide a passage through which said heated, humidified air passes upwardly to the hot air pipes that conduct it to the rooms to be heated in the winter time, or air conditioned in the summer. The descending air flow utilizes furnace space that might otherwise not be used, and makes it possible to construct a round furnace in which this pre-warmed moist air is introduced to the heating elements at points all around the same.

Another object of my invention is to provide below the spaced, vertical heating elements, sectional burner members, which may be adapted to use gas, oil, kerosene or gasoline as a fuel, or to take the form of electric heating elements. The air tubes of the heating elements are staggered so that the ascending heat units will pursue a zig zag course around them, and thereby heat in an optimum manner the moist air which passes through them.

It is another object of my invention to provide burners that may be connected together in a circuitous manner to pass through each other, gas or other fuel from a central source, with means for cutting off those burners which are not used, and for gradually reducing the size of the fuel conducting passages of the burners as they approach the end ones.

Another object of my invention is to provide an air-conditioning furnace which will require no more floor space than any ordinary furnace. The number and size of the burners and heating elements, and the diameter of the furnace, may be varied to conform to the size and number of the rooms to be heated.

In the summertime moisture may be withdrawn from the descending air column by using cool tap water, or pre-cooled water, in the spraying device. After being forced through this cool water spray by the fan, the air will be properly cooled and conditioned for introduction to the various rooms that are heated by the furnace in the wintertime.

Other important and incidental objects will be brought out in the following specification and particularly set forth in the subjoined claims.

Figure 1:
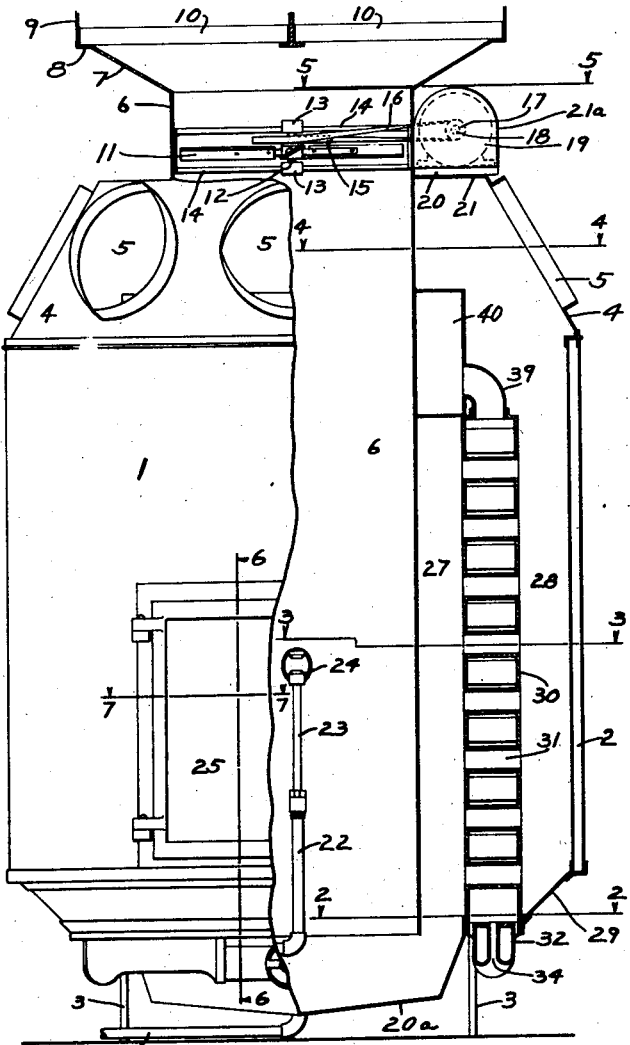
Figure 6:
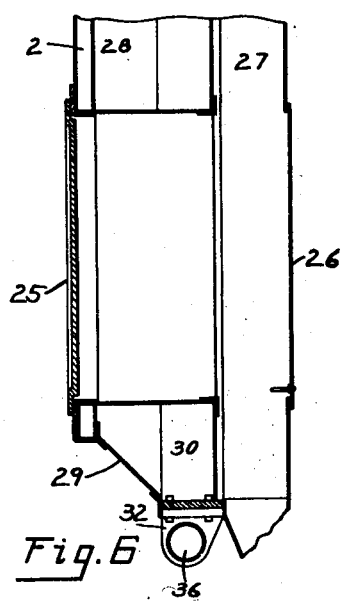
Figure 7:
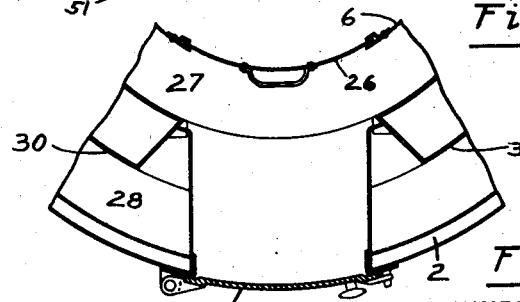

In the accompanying drawings illustrating various forms of embodiment of my invention, Figure 1 is a front elevational view, partly in section, of my air-conditioning furnace. Figure 2 is a transverse sectional view taken through one sector of the furnace on the line 2—2 of Figure 1, showing one of the burners and a valved tube for connecting it to an adjacent burner. Figure 3 is a cross-sectional view taken through another sector of the furnace, on the line 3—3 of Figure 1, showing the circular arrangement of the heating elements around the central air entrant passage. Figure 4 is a transverse sectional view taken through another sector of the furnace on the line 4—4 of Figure 1, showing the annular conduit or radiator collar, and its discharge pipe, for conducting the hot gases from the burners, around the descending air to prewarm the latter before it passes through the water spray. Figure 5 is a cross sectional view taken through another sector of the furnace on the line 5—5 of Figure 1, showing the air fan, motor and rubber motor-base support. Figure 6 is a vertical sectional view taken on the line 6—6 of Figure 1, showing the interior construction of the furnace, with its inner and outer doors. Figure 7 is a cross sectional view taken on the line 7—7 of Figure 1, illustrating the same interior portion of the furnace between the inner and outer doors. Figure 8 is a perspective view, partly broken away and in section, of one of the heating elements. Figure 9 is a perspective view of one of the burner castings, showing the fuel conducting tube therethrough for communication with a valved connecting pipe. Figure 10 is a longitudinal sectional view taken through one of the burners, showing a valved pipe connected to each end thereof. Figure 11 is a perspective view of a modified heating element having vertical tubes through which the hot gases pass to heat the moistened air which is deflected around them, and then upwardly, by heat-conducting fins.

And Figure 12 is a perspective view of one form of electric heating element that may be substituted for the burners and other heating elements shown.

Referring to the accompanying drawings for a detailed description of the various forms of embodiment of my invention illustrated therein, the numeral 1 designates a furnace of preferably round contour and having a double outer wall 2. The furnace is mounted on legs 3 that project downwardly from air-confining plates hereinafter to be described.

Secured upon the top of the circular double wall 2 of the furnace 1 is a bonnet 4 formed with leader connections 5. Mounted on the bonnet 4 is an air inlet tube 6 terminating at its upper end in an outwardly flaring head 7. The latter is formed with an annular seat 8 and flange 9 to receive a removable air filter 10 preferably constructed of glass wool. Since the entrance of air is retarded or slowed down by the air filter, its area is adjusted to the capacity of the shell 6.

Although it may be omitted, I have provided in the lower portion of the tube 6 a horizontal downdraft fan 11 mounted on a vertical shaft 12 journaled in bearings 13, 13 mounted on radial supports 14. Secured to the shaft 12 is a pulley 15 around which there passes a drive belt 16 that also passes around a pulley 17 on the armature shaft 18 of an electric motor 19. The latter is mounted on a rubber base 20 supported by the top 21 of the bonnet 4, to insure a noiseless operation of it, and is protected by a cover 21ª.

The tube 6 projects downwardly through the middle portion of the furnace to bring its lower open end within a short distance above the bottom of a drain pan 20ª to be hereinafter referred to.

Projecting upwardly through the open lower end of the air tube or shell 6, is a vertical pipe 22 which receives, for vertical adjustment therein, a tube 23 carrying on its top a spray nozzle 24 for projecting water, from a source not shown, laterally to form a spray through which the descending air passes for the purpose of picking up moisture therefrom. In the summertime cool tap water, or pre-cooled water, may be forced through the spray to withdraw moisture from the descending warm air and cool the same for introduction into the rooms in communication with the furnace.

Access to the interior of the lower central portion of the furnace is first had through a hinged door 25 that covers an opening in the outer wall 2, after which access may be had to the interior of the air tube 6 through a vertically slidable door 26.

Disposed around the air tube 6, below the bonnet 4, are circularly spaced heating elements. These heating elements are also arranged to leave between them and the wall of the tube 6, a passage 27 to receive the air discharged from the bottom of that tube for direction into said elements. Between the latter and the outer wall 2 of the furnace, there is provided a passage 28 closed at its lower end by an upwardly tapering bottom 29, to direct the conditioned air upwardly into the leader connections 5, and through hot air pipes (not shown) into the various rooms to be heated or conditioned.

In Figures 1, 2 and 8, the heating elements take the form of elongated vertical radiators 30 containing staggered, horizontal air tubes 31. These tubes communicate with the passages 27 and 28 to receive conditioned air from the former for discharge into the latter after it is heated by the hot gases generated by burners placed below the radiators.

Gas, gasoline, kerosene or fuel oil may be used in the burners. When gas is employed, I prefer to use the type of burner illustrated in Figure 9. This burner comprises a casting 32 having a segmental, perforated, top 33 divided by a central groove 34. At each end the burner 32 terminates in a flat plate portion 35 whose side edges follow the contour of the perforated burner segments. Formed in the bottom of each burner casting is a curved tubular gas receiving part which is internally threaded at each end to receive the externally threaded end of a valved tube connection 37, and gradually diminishes in diameter from the front to its rear end.

The bottom of each radiator 30 is curved and formed with projecting edges 38ª that fit over the perforated burner segments 33, 33 of a respective burner casting 32. When so mounted on a burner, the hot gases emitted by the latter will pass upwardly for a baffling contact with the staggered tubes 31, to concentrate a well confined heat upon the latter for the purpose of thoroughly and economically heating the conditioned air which moves through these tubes from the passage 27 to the passage 28.

After a baffled ascent through the radiators 30, the hot gases from the burners 32 pass from sleeve openings 38, and bends 39 at the tops of the radiators, into an annular radiating collar 40 that surrounds the upper portion of the air tube 6. The hot gases which enter this annular collar, preheat the air which descends through the tube 6 by virtue of their circular contact with the wall of the tube before passing out of the furnace through a discharge pipe 41. (See Figures 1 and 2.) The collar 40 also seals the top portion of the passage 27 to prevent any escape of conditioned air except through the tubes 31.

From a pipe 42, gas is introduced into a horizontal T shaped mixer 43. The transverse portions of this mixer lie within the furnace between two burner castings 32, 32, being connected to the plate ends thereof by bolts 44 or other suitable fastening elements. (See Figure 2.)

For the purpose of conducting gas from the mixer 43, to all of the burners circuitously arranged on each side of it, I have provided means such as the valved tubes 37, for connecting these burners together. Not only may the gas from the central source 43 flow in a gradually diminishing amount through these connected burners to the two end ones, but any desired number of them may be cut off from the first burners by closing the valves 45 in the connecting tubes 37.

The valve tubes 37, two of which are shown connected to a burner 32 in Figure 10, are covered by plates 46 connected by bolts 47 or other suitable means to the plate ends 35 of the burners 32. (See Figure 2.) These plates not only assist in confining the conditioned air within the furnace, but also prevent the admission of air between the burners from the outside to mix with the humidified air and thus reduce its efficacy. These plates 46 are the ones to which the legs 3 of the furnace are secured.

Vertical baffle plates 49 are secured between spaced lugs 50, 50 on the end sides of the radiators 30 to prevent the flow of air laterally between these sections without passing through the horizontal tubes.

The drain pan 20ᵃ laps against the lower front side portions of the radiators to catch the water which falls from the spray to drain it away through a drain pipe 51.

In Figure 11 I have illustrated a modified form of heating element that may be substituted for the radiators 30. This element comprises a radiator 52 which is formed at its lower end with a header portion having downwardly projecting edges 53, 53 to fit the top of a burner casting 32. Projecting upwardly from the bottom header of this radiator 52 to the top header within it, is a series of vertical tubes 54 through which the hot gases from the burner ascend. From the top header these gases pass through a sleeve opening 55 into the bend 39 which conducts them to the annular radiator collar to preheat the descending column of air in the shell 6.

The vertical tubes 54 in the radiators 52 pass through heat-conducting, vertically spaced fins 56 that have downwardly flared front edges 57 to direct the conditioned air in the passage 27 upwardly and around the hot tubes 54. At their rear ends these fins are inclined upwardly to direct the heated air upwardly into the passage 28 for discharge through the leader connections 5 into the hot air pipes leading to the various rooms to be heated or cooled.

In Figure 12 I have illustrated an electrical heating unit which may be substituted for the burners and heating elements already described. This electrical heating element comprises a curved base 58 from which there arise spaced sides 59, 59 supporting a curved top 60. Projecting between the top portions of these sides is a transverse member carrying two grooved insulator spools 61, 61 around which passes a ribbon electrode 62, the free ends of which are connected to contact studs 63, 63 that pass through the base 58. A lower transverse member 64 connected between the sides 59, 59, carries a grooved middle insulator spool 65 and two similar end spools 66, 66 around which the ribbon electrode 62 passes as shown in Figure 12.

When the ribbon heating element 62 is included in an electric circuit and the current turned on, its strands will heat the humidified air which passes between them from the passage 27 to the passage 28, in the same manner as the hot gases emitted by the burners 32. Whatever type of heating elements are employed, the closely confined humidified air will be thoroughly heated by the concentrated heat generated by them and to which the air is exposed from all around the furnace.

Having described my invention, I claim:

1. A furnace of the type described, comprising an outer casing, an inner shell projecting from the top of the furnace to a point near its bottom, to conduct air downwardly therethrough, means in said shell for humidifying the descending air, heating units surrounding the inner shell and spaced a sufficient distance therefrom to form a passage to receive the air which descends through said shell, transverse air passages in said heating units, communicating with the air passage between said units and the inner shell, a passage between the heating units and the outer wall of the casing to receive the air which passes through the transverse passages of the heating units, and an air outlet in the outer casing, in communication with the upper part of the last-named passage.

2. A furnace of the type described, comprising an outer casing, an inner shell projecting from the top of the furnace to a point near its bottom, to conduct air downwardly therethrough, means in said shell for producing a vertically adjustable water spray through which the air descends, heating units surrounding the inner shell and spaced a sufficient distance therefrom to form a passage to receive the air which descends through said shell, transverse air passages in said heating units, communicating with the air passage between said units and the inner shell, a passage between the heating units and the outer wall of the casing to receive the air which passes through the transverse passages of the heating units, and an air outlet in the outer casing, in communication with the upper part of the last named passage.

3. A furnace of the type described, comprising an outer casing, an inner shell projecting from the top of the furnace to a point near its bottom, a fan mounted in the upper portion of the shell to force outside air downwardly therethrough, means for rotating said fan, means in said shell for humidifying the descending air, heating units surrounding the inner shell and spaced a sufficient distance therefrom to provide a passage to receive air which descends through said shell, transverse air passages in said heating units, communicating with the air passage between said units and the inner shell, a passage between the heating units and the outer wall of the casing to receive the air which passes through the transverse passages of the heating units, and an air outlet in the outer casing, in communication with the upper part of the last named passage.

4. A furnace of the type described, comprising a circular outer casing, an inner shell projecting from the top of the furnace to a point near its bottom, to conduct air downwardly therethrough, means in said shell for humidifying the descending air, vertical heating units completely surrounding the inner shell and spaced a sufficient distance therefrom to provide a passage to receive the air which descends through said shell, transverse air passages in said heating units, communicating with the air passages between said units and the inner shell, a passage between the circularly arranged heating units and the outer wall of the casing to receive the air which passes through the transverse passages of the heating units, and an air outlet in the outer casing, in communication with the upper part of the last-named passage.

5. A furnace of the type described, comprising an outer casing, an inner shell projecting downwardly from the top of the furnace to a point near its bottom, to conduct air downwardly therefrom, means in said shell for humidifying the descending air, heating units surrounding the inner shell and spaced a sufficient distance therefrom to provide a passage to receive the air which descends through said shell, transverse air passages in said heating units, communicating with the air passages between said units and the inner shell, a passage between the heating units and the outer wall of the casing to receive air which passes through the transverse passages of the heating units, an air outlet in the upper portion of the outer casing, in communication with the upper part of the last-named passage, burners below said heating units, a fuel supply to which the first two of said burners are connected, fuel passages in said burners, and valved means connected to the fuel passages in said burners to pass fuel from one to the other, or to close off any number of said burners except the first two which are connected to the fuel supply.

6. A furnace of the type described, comprising an outer casing, an inner shell projecting from the top of the furnace to a point near its bottom, to conduct air downwardly therethrough, means in said shell for humidifying the descending air, heating elements for said air between the shell and outer wall of the furnace, burners below said heating elements, an annular radiator surrounding the upper portion of the inner shell of the furnace, a tubular connection between said heating elements and the radiator to conduct the hot gases from the burners to said radiator which conducts them around, and in contact with, said inner shell to preheat the descending air within it before passing the humidifying means and an outlet in the outer casing for the air heated by the heating elements.

7. A furnace of the type described, comprising an outer casing, an inner shell projecting from the top of the furnace to a point near its bottom, to conduct air downwardly therethrough, means in said shell for humidifying the descending air, heating units surrounding the inner shell and spaced a sufficient distance therefrom to form a passage to receive the air which descends through the shell, transverse air passages in said heating units, in communication with the passage between the heating units and the inner shell, burners below said heating units, an annular radiator closing the upper portion of said passage and surrounding the inner shell, a tubular connection between the heating elements and said radiator to conduct the hot gases from the burners to said radiator which conducts them around, and in contact with, the inner shell, to pre-heat the descending air within it before passing the humidifying means, and an outlet in the outer casing for the air which passes through the transverse passages in the heating elements.

CHARLES C. WILSON.